US007012604B1

(12) United States Patent
Christie et al.

(10) Patent No.: US 7,012,604 B1
(45) Date of Patent: Mar. 14, 2006

(54) SYSTEM ARCHITECTURE FOR HIGH SPEED RAY TRACING (75) Inventors: David S. Christie, Austin, TX (US); Uwe Kranich, Kirchheim (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 218 days.

(21) Appl. No.: 10/242,199

(22) Filed: Sep. 12, 2002

(51) Int. Cl.
G06T 15/60 (2006.01)

(52) U.S. Cl. .................................................... 345/426
(58) Field of Classification Search ................. 345/426
See application file for complete search history.

(56) References Cited

U.S. PATENT DOCUMENTS

| 4,862,392 | A | * | 8/1989 | Steiner | 345/427 |
| 5,305,430 | A | * | 4/1994 | Glassner | 345/427 |
| 5,933,146 | A | * | 8/1999 | Wrigley | 345/420 |
| 6,326,963 | B1 | * | 12/2001 | Meehan | 345/419 |

OTHER PUBLICATIONS

"A Real-Time Procedural Shading System for Programmable Graphics Hardware", Proudfoot, et al., International Conference on Computer Graphics and Interactive Techniques, pp. 159-170, Year of Publication: 2001, ISBN:1-58113-374-X.*
"Adaptive Mesh Generation for Global Diffuse Illumination", Campbell et al., International Conference on Computer Graphics and Interactive Techniques, pp. 155-164, Year of Publication: 1990, ISSN:0097-8930.*
"New Chip Displays Its Powers", Anning, et al, *New Scientist*, vol. No. 1500, Mar. 20, 1986, pp. 43-46.

*Computer Graphics Principles and Practice*, Second Edition in C, Foley, et al, Addison-Wesley Publishing Company, Inc., US, Nov. 1999, pp. 701-715; 776-793.
"The AR250, A New Architecture for Ray Traced Rendering", Hall, *Graphics Hardware 1999, Siggraph Eurographics Workshop*, Aug. 8, 1999, http:www.ibiblio.org/hwws/previous/www_1999/wkshp.html.
"The AR350: Today's Ray Trace Rendering Processor", Hall, *Graphics Hardware 2001, Siggraph Eurographics Workshop*, Aug. 12, 2001, http://www.ibiblio.org/hwws/previous/www_2001/wkshp.htm.
"Graphics/Raytrace FAQ", Internet FAQ Archives, Markus Kniebes, http:///.faqs.org/faqs/graphics/raytrace-faqs, Apr. 19, 2001.
"Interactive Global Illumination", Wald, et al, *Technical Report TR-2002-02*, Wald, et al, Computer Graphics Group, Saarland University, Saarbrü cken, Germany.

(Continued)

*Primary Examiner*—Almis R. Jankus
*Assistant Examiner*—Jon Hadidi
(74) *Attorney, Agent, or Firm*—Meyertons Hood Kivlin Kowert & Goetzel, P.C.; B. Noël Kivlin (57) ABSTRACT A system and method for generating images of three-dimensional objects. The system includes one or more tracing processors, and one or more shading processors. Each of the tracing processors may be configured to (a) perform a first set of computations on a corresponding group of primary rays emanating from a viewpoint resulting in a ray tree and a set of one or more light trees for each primary ray of the corresponding group, (b) transfer the ray trees and associated light trees to one of the shading processors, and (c) repeat (a) and (b). Each of the shading processors may be configured to (d) receive ray trees and associated light trees from one of the tracing processors, (e) perform a second set of computations on the received ray trees and associated light trees to determine pixel color values, and (f) repeat (d) and (e) a plurality of times.

23 Claims, 5 Drawing Sheets

Ray Tree

● Contains Intersection info $R_{KL}$: Ray where subscripts denote Reflect or Transmit
$I_L$: Intersection=Element One LightTree ● Contains Lighting info

OTHER PUBLICATIONS

"Publications Related to the OpenRT Interactive Ray Tracing Project", Benthin, *OpenRT: Publications*, http://www.openrt.de/publications, Jul. 22, 2002.

"A Simple and Practical Method for Interactive Ray Tracing of Dynamic Scenes", Wald, et al, Saarland University, Saarbrü cken, Germany, Apr. 2002.

"SaarCOR—A Hardware Architecture for Ray Tracing", Schmittler, et al, *Graphics Hardware 2002, Siggraph Eurographics Workshop*, Sep. 1, 2002, http://www.ibiblio.org/hwws/previous/www_2002/wkshp.html.

"Interactive Headlight Simulation—A Case Study of Interactive Distributed Ray Tracing", Benthin, et al, *Fourth Eurographics Workshop on Parallel Graphics and Visualization*, Blaubeuren, Germany, Sep. 9-10, 2002, presented Sep. 10, 2003.

"Interactive Global Illumination Using Fast Ray Tracing", Wald, et al, $13^{th}$ *Rendering Workshop*, Organized by the Eurographics Association, National Research Council, Pisa, Italy, Jun. 26-28, 2002.

"State of the Art in Interactive Ray Tracing", Wald, et al, *Eurographics '01*, The Eurographics Association Computer Graphics Group, Saarland University, Saarbrucken, Germany, 2001.

"A Flexible and Scalable Rendering Engine for Interactive 3D Graphics", Wald, et al, *Technical Report TR-2002-01*, Wald, et al, Computer Graphics Group, Saarland University, Saarbrü cken, Germany.

"Interactive Distributed Ray Tracing of Highly Complex Models", Wald, et al, Computer Graphics Group Saarland University, Saarbruecken, Germany. (see A7 p. 3).

"Interactive Rendering with Coherent Ray Tracing", Wald, et al, *Eurographics '01*, vol. 20 (2001), No. 3, The Eurographics Association, 2001.

"A Real-Time Prcedural Shading System for Programmable Graphics Hardware", Proudfoot, et al, *Graphics Hardware 2001, Siggraph Eurographics Workshop*, Aug. 2001, http://graphics.stanford.edu/projects/shading/pubs/sig2001.

"Version 5 Real-Time Shading Language Description", Proudfoot, Oct. 26, 2000, http://graphics.stanford.edu/projects/shading/docs/lang5.doc.

"Efficient Partitioning of Fragment Shaders for Multipass Rendering on Programmable Graphics Hardware", Chan, et al, *Proceedings of the SIGGRAPH/Eurographics Workshop on Graphics Hardware 2002*, Saarbruecken,. Germany, Sep. 1, 2002.

"Shading System Immediate-Mode API v2.2", Mark, et al, Aug. 29, 2001, http://graphics.stanford.edu/projects/shadings/docs/imode_spec_v2.2.pdf.

"The F-Buffer: A Rasterization-Order FIFO Buffer for Multi-Pass Rendering", Mark, et al, *Graphics Hardware 2001, Proceedings of Siggraph Eurographics Workshop*, Saarbruecken,. Germany.

"Compiling to a VLIW Fragment Pipeline", Mark, et al, *Graphics Hardware 2001, Siggraph Eurographics Workshop*, 2001, http://www.graphics.stanford.edu/projects/shading/pubs/hwws2001-regcomb.

"Stanford Real-Time Procedural Shading System", Mark, SIGGRAPH 2001 Course Notes, Apr. 18, 2001 http://graphics.stanford.edu/projects/shading/pubs/sigcourse2001.pdf.

* cited by examiner

SYSTEM ARCHITECTURE FOR HIGH SPEED RAY TRACING

BACKGROUND OF THE INVENTION

1. Field of the Invention

This invention relates to a system for generating images, and more particularly, to a ray-tracing system for generating images of three-dimension scenes in real-time.

2. Description of the Related Art

Ray tracing is the term used to describe a method for generating images of three-dimensional scenes. The method involves sending out a system of rays from a viewpoint in a world space. The world space may be populated by a collection of three-dimensional objects. Color values are computed for each of these rays, and the color values determine the pixels of a displayable image. To compute a color value (e.g. a RGB color vector) for a given ray may involve a set of computations such as the following. The point where the ray encounters its first intersection with an object may be determined. At this "primary" intersection point, a reflection ray and a transmission ray may be determined. (The transmission ray may be computed on the basis of Snell's law of optics.) The reflection ray and transmission ray propagate until they intersect with an object. At each of these two "secondary" intersection points, new reflection and transmission rays may be determined. Now the four rays propagate until they hit four intersection points. For the sake of discussion, assume the propagation of rays stops with the four intersection points. Next, a local lighting computation is performed at the four intersection points to determine color values. Then color values at the two secondary intersection points are determined based on local lighting and some linear combination of the color values at the four intersection points. Finally, a color value at the primary intersection point is determine based on local lighting and a linear combination of the color values at the secondary intersection points. Obviously the number of intersection points grows exponentially with the number N of ray spawning stages. Thus, ray tracing is a computationally expensive process. However, the images generated with ray tracing are often more realistic and/or visually pleasing than images generated by other means. Thus, in general, there exists a need for systems and methodologies for performing ray tracing with increased speed.

SUMMARY OF THE INVENTION

In one set of embodiments, a visualization system for generating images of three-dimensional objects may include one or more tracing processors, and one or more shading processors. Each of the tracing processors may be configured to:

(a) perform a first set of computations on a primary ray emanating from a viewpoint resulting in a ray tree and an associated set of one or more light trees, (b) transfer the ray tree and the associated set of one or more light trees to one of the shading processors, and (c) repeat (a) and (b) for a plurality of primary rays emanating from the viewpoint.

Furthermore, each of the shading processors may be configured to:

(d) receive a ray tree and the associated set of light trees from one of the tracing processors, (e) perform a second set of computations on the received ray tree and associated set of light trees to determine a pixel color, and (f) repeat (d) and (e).

The tracing processors may operate in parallel on separate primary rays (or groups of primary rays) emanating from the viewpoint. Each of the shading processors may operate in parallel on separate buckets (or sets of buckets). A bucket includes a ray tree and the associated light trees that are derived from a single primary ray.

The first set of computations may operate on a set of vertices and corresponding normal vectors. The set of vertices define triangles for objects in a scene (e.g. a frame in a 3D animation or a computer-aided design). The normal vectors represent surface normals for the objects. Nodes of the ray tree correspond to intersections between the objects and rays derived from the primary ray. Each of the light trees includes lighting information with respect to a corresponding light source for each of the intersections in the associated ray tree. In some embodiments, other types of graphical elements (such as higher-order surfaces, etc.) may be supported in addition to or instead of triangles or polygons.

The first set of computations may include repeated applications of a ray tracing computation, a shadow information computation and a ray spawning computation. The ray tracing computation propagates a ray to determine an intersection with a nearest object along the ray's path. The shadow information computation determines the visibility (or amount of visibility) of one or more light sources at the intersection point. The ray spawning computation computes a reflective ray and transmissive ray at the intersection.

The ray spawning computation may be application programmable by a software application executing on a host computer (e.g., a desktop computer, a workstation, a computer coupled to the visualization system through one or more networks, etc.). In one embodiment, a ray spawning computation may be determined by ray spawning code transferred to each of the tracing processors in response to one or more commands asserted by the software application. In addition, the shadow information computation may be application programmable by a software application executing on a host computer.

The second set of computations may include a global lighting combine operation which combines information from the ray tree and the associated light trees in a bottom-up fashion to determine the pixel color. The global lighting combine operation may be application programmable by the host software application.

In another set of embodiments, a method for generating images of three-dimensional objects may be arranged as follows. A host program executing on a host computer may invoke the transfer of ray spawning code to a first processing unit. The first processing unit may perform a first set of computations to determine a ray tree and one or more light trees. The first set of computations may include one or more ray tracing operations and one or more ray spawning operations. The first processing unit performs the ray spawning operations by executing the ray spawning code. The first processor transfers the ray tree and the associated light trees to a second processing unit. The second processing unit performs a second set of computations on the ray tree and associated light trees to determine pixel color. The pixel color determines a pixel in an output image. The output image may be a frame in a real-time video stream.

In yet another set of embodiments, a system 3D image generation system may include one or more tracing processors and one or more shading processors. The tracing processors may be configured to generate ray trees corresponding to primary rays emanating from a viewpoint in an object space. The shading processors couple to the tracing processors and may be configured to operate on the ray trees to generate pixel values. The pixel values determine an output image. One or more of the tracing processors may include a general-purpose CPU as the algorithms for accelerating ray tracing performance are expected to improve over time. The shading processors may include specialized processors configured to support a virtual graphics language.

The number and type of tracing processors, and the number and type of shading processors may vary from one implementation to the next. A designer of the visualization system may determine these numbers and types to achieve a desired balance of cost and performance. To support maximum flexibility in the range of choices available for the tracing processors and the shading processors to be incorporated in the visualization system, the data structures which are transferred from the tracing processors to the shading processors are configured to be application programmable.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

1. General

Ray tracing is a very compute intensive process. However, next generation central processing units (CPUs) and multi-processor (MP) systems will be more capable of delivering the computer power required for real time ray tracing (RTRT).

Ray tracing may be performed with different types of graphical elements such as triangles, spheres and parameterized surfaces (e.g. higher-order surfaces determined by control parameters). The following discussion focuses mostly on the use of triangles. However, the mechanisms described herein may be used with a variety of different element types.

Figure 1:
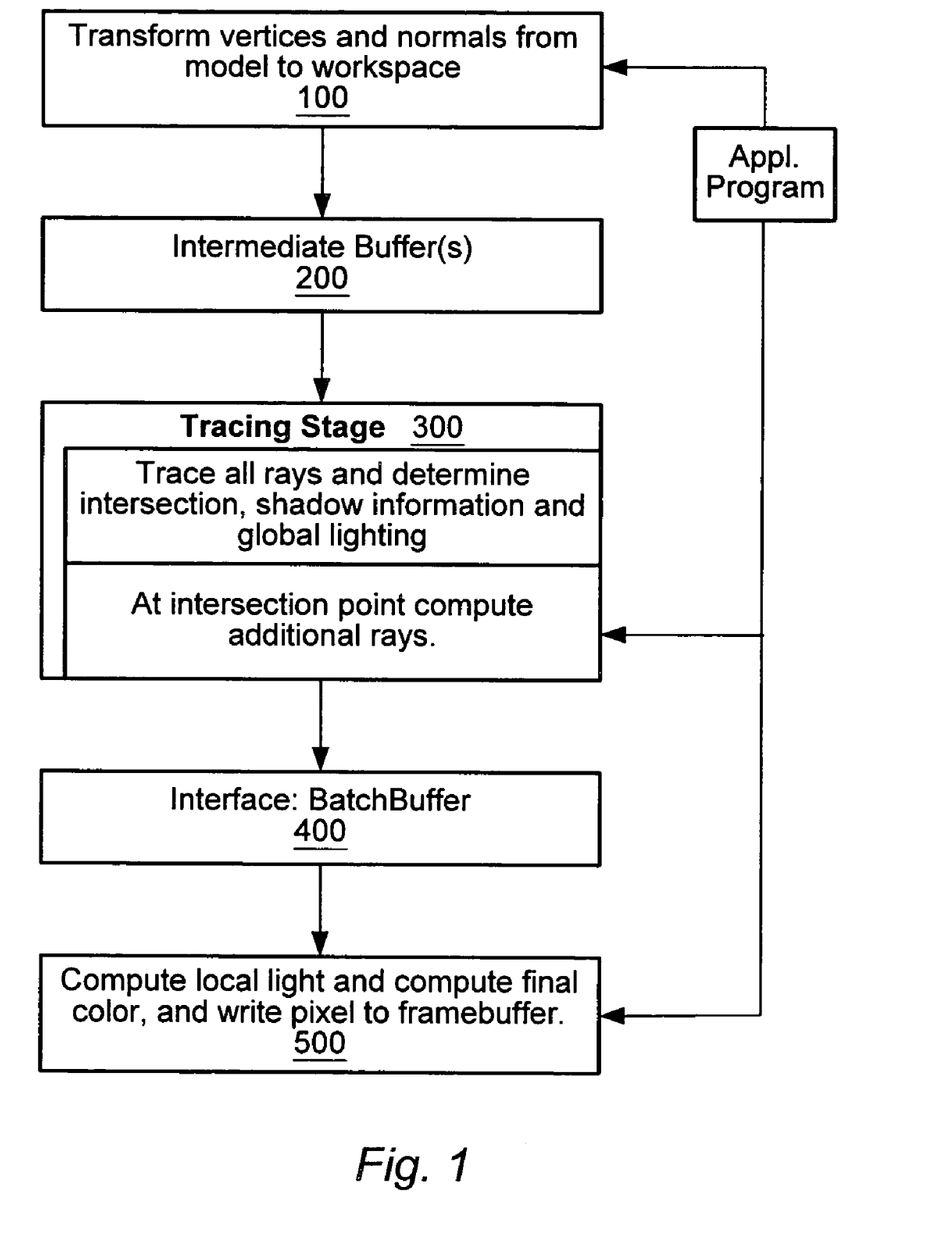
FIG. 1 is a diagram illustrating one embodiment of several processing stages in an image generation computation.

In one set of embodiments, a method for rendering three-dimensional objects (or N-dimensional objects where N is a positive integer) may be arranged as illustrated in FIG. 1.

Stage 1: Transformation
In a transformation stage 100, vertices are transformed from model coordinates to world coordinates. Normal vectors are also transformed. Ray tracing is a global lighting model. Therefore, a set of vertices corresponding to the triangles of a scene may be transformed prior to the next stage (i.e. tracing). The results of the transformation stage 100 may be written into an intermediate buffer 200.

Stage 1A: Global Light preprocessing
In an optional global light preprocessing stage, additional information may be added to the transformed elements. For example, this stage may be used to generate photon maps.

Stage 2: Tracing
In a tracing stage 300, rays are traced to determine intersection points between rays and objects, and a shadow computation is performed to determine which light sources are visible at the intersection points. Also, global lighting is implicitly performed by determining reflective and transmissive rays at the intersection points.

Stage 3: Shading
In a shading stage 500, the intersection information and light information is used together with some material properties (e.g. textures, bump maps, etc.) to form a final pixel value for each ray, which is rendered.

Each of these stages may use its own processor (or set of processors). In the following descriptions the processor for the transform stage 100 is called the transform processor (XFP); the processor for the tracing stage 300 is called the tracing processor (TRP), and the processor for the shading stage 500 is called the shading processor (SHP).

Any or all of these stages may be parallelized. Thus, any or all of the XFP, TRP and SHP may include multiple parallel physical processors. In some embodiments, parallelizing the transform and tracing stages may involve two or more intermediate buffers, e.g. a first buffer to store the transformed triangles of a scene, and a second buffer to store the corresponding object descriptors (i.e. materials, textures, etc.).

In one embodiment, the TRP performs the transform stage processing as well as the tracing stage processing. Thus, the XFP and the intermediate buffers between the XFP and TRP may be eliminated in this embodiment.

2. Architecture of the Processors

Each of the XFP, TRP and SHP may be realized by a general purpose CPU or a specialized processor (SP). As used herein, the term "specialized processor" includes any circuit, device or system whose hardware organization has been optimized to perform a set of graphical computations such as three-dimensional rendering computations. Specialized processors may have fixed functionality, or alternatively, may have varying levels of programmability. For example, a specialized processor may be configured to support a graphics API (application programmer's interface) such as DirectX 8 Vertex Virtual Machine (DX8 VVM), Renderman, OpenGL and so on. The AR250 chip manufactured by Advanced Rendering Technology is an example of a specialized processor.

One or more specialized processors may be used to implement the XFP because the transform stage operations are well defined. However, in some alternative embodiments, one or more general-purpose processors may be used to implement the XFP.

As noted above, in some embodiments the transform stage processing may be performed by the TRP, and thus, the XFP may be omitted.

Algorithms for improving the performance of ray tracing rely on reducing the number of intersection tests rather than speeding up the intersection tests. These algorithms are expected to change and improve over time. Furthermore, these algorithms involve conditional branching operations (such as "if condition X is true, execute Y; else execute Z"). Thus, in one set of embodiments, the TRP may be realized by a set of one or more general-purpose CPUs. As used herein, the term "general-purpose CPU" is intended to include any of a variety of microprocessors or microprocessor-based systems such as those manufactured by Advanced Micro Devices, Inc.

The shading stage operations are fairly stable and have mostly linear control flow (i.e. do not require branches very often). Furthermore, the shading stage operations are very compute intensive (e.g., as when multiple textures and bump mapping are applied). These properties suggest that specialized hardware may be of benefit for implementing the SHP. Thus, in one set of embodiments, the SHP may be realized by a set of one or more specialized processors.

In one set of embodiments, the TRP is implemented using a general-purpose CPU, and the SHP is implemented using a specialized processor.

In one alternative embodiment, the SHP is implemented with a general-purpose CPU.

In some embodiments, either or both of the TRP and the SHP may be realized by multiple parallel processors. Support for symmetrical multi-processing (SMP) may be implemented in the system architecture of these embodiments.

2.1 Application Programmable TRP and SHP

In addition to being programmable, a processor (such as the XFP, TRP or SHP) may be application programmable. As used herein the term "application programmable" as applied to a processor means that a software application running on a host computer can specify the functionality of the processor (i.e. the computational algorithms to be performed by the processor). For example, in one set of embodiments, the software application may specify the functionality of the processor by calling pre-defined functions of an API (e.g. a graphics API such as OpenGL or DirectX 8 Vertex Virtual Machine). The API functions have a well-defined software interface that application developers can rely upon. Furthermore, the API functions handle the hardware-oriented details of interacting with the processor.

In another set of embodiments, the software application may specify the functionality of the processor by downloading machine code to the processor. The processor executes the machine code to enact the application specified functionality.

In yet another set of embodiments, the software application may specify the functionality of the processor by downloading a set of machine-independent instructions to a translation agent. The translation agent may translate the machine-independent instructions into machine code executable by the processor, and forward the machine code to a memory accessible by the processor.

In one set of embodiments, the TRP and the SHP are application programmable. Thus, the functions performed by the TRP and the SHP may be defined by a software application (within the limits of programmability imposed by selections of a TRP and an SHP).

Certain operations or algorithms within the tracing stage and/or shading stage may be defined by the software application using a virtual graphics language (VGL) such as Microsoft's DX8 VVM, OpenGL or Renderman. As defined herein, the term "virtual graphics language" refers to a language which allows programmers to invoke graphics operations in a hardware-independent fashion.

In one collection of embodiments, the programmability of the different stages is as follows.

Transform.

The complete transform (from model space to world space) may be application programmable (e.g. with VGL instructions). In other words, the transform of the vertices and the normals may be application defined. This allows features such as vertex blending.

Tracing

The tracing stage involves the propagation of a set of primary rays (e.g. a set or primary rays that intersect a rectangular array of pixels) from a viewpoint. A ray tracing computation is performed to determine where a primary ray first intersects an object. Shadow information relative to one or more light sources is computed at the intersection point. New rays (i.e. a transmissive ray and a reflective ray) are spawned from the intersection point. Then the process is repeated on the new rays: the ray tracing computation is performed on each of the new rays until their first intersection with an object, and so on.

In one set of embodiments, the ray tracing computation and the shadow information computation are performed on a general-purpose CPU, and are not configured to be application programmable. (The ray tracing computation and the shadow information computation involve operations such as conditional branches which are easily implemented on a general-purpose CPU and not so easily implemented on a specialized processor. For the sake of speed, the machine code implementing these computations may be highly optimized for the particular general-purpose CPU on which they will execute.)

In contrast, the ray spawning computation (i.e. generation of the transmission and reflective rays at the intersections) may be application programmable. Thus, a software application may specify its own special reflectance-transmittance model for the ray spawning computation.

The ray spawning computation may be performed on the general-purpose CPU, or alternatively, on a specialized processor (SP). However, there may be increased overhead involved with sending data to the SP and waiting until results are available from the SP.

Shading

In some embodiments, the shading stage involves a local lighting step and a global lighting combine (GLC) step. These steps may be application programmable. Thus, the application may specify it own local lighting instructions and GLC instructions. By using these instructions, the SHP may perform nearly any operation on the lighting data provided by the TRP. The local lighting computation may be performed in world space. The application programmability also allows texture transforms, etc. If the SHP uses an SP (specialized processor), the VGL instructions may map directly to the SP instructions.

In several places in the following discussion, it may be assumed that the SHP can perform local lighting code (e.g. a set of VGL instructions configured to control a local lighting computation). This assumption adds little complexity to the SHP. Therefore the alternative is only indicated at certain points.

The local lighting computation may include the computation of diffuse and/or specular color values at the intersection points.

The application program may rely on predefined standard instruction sequences (e.g. may call macros comprising such predefined instruction sequences) to specify the application programmable portions of the transform, tracing and/or shading stages.

In one set of embodiments, the operation of a real-time ray tracing system may be described as follows.

Figure 2:
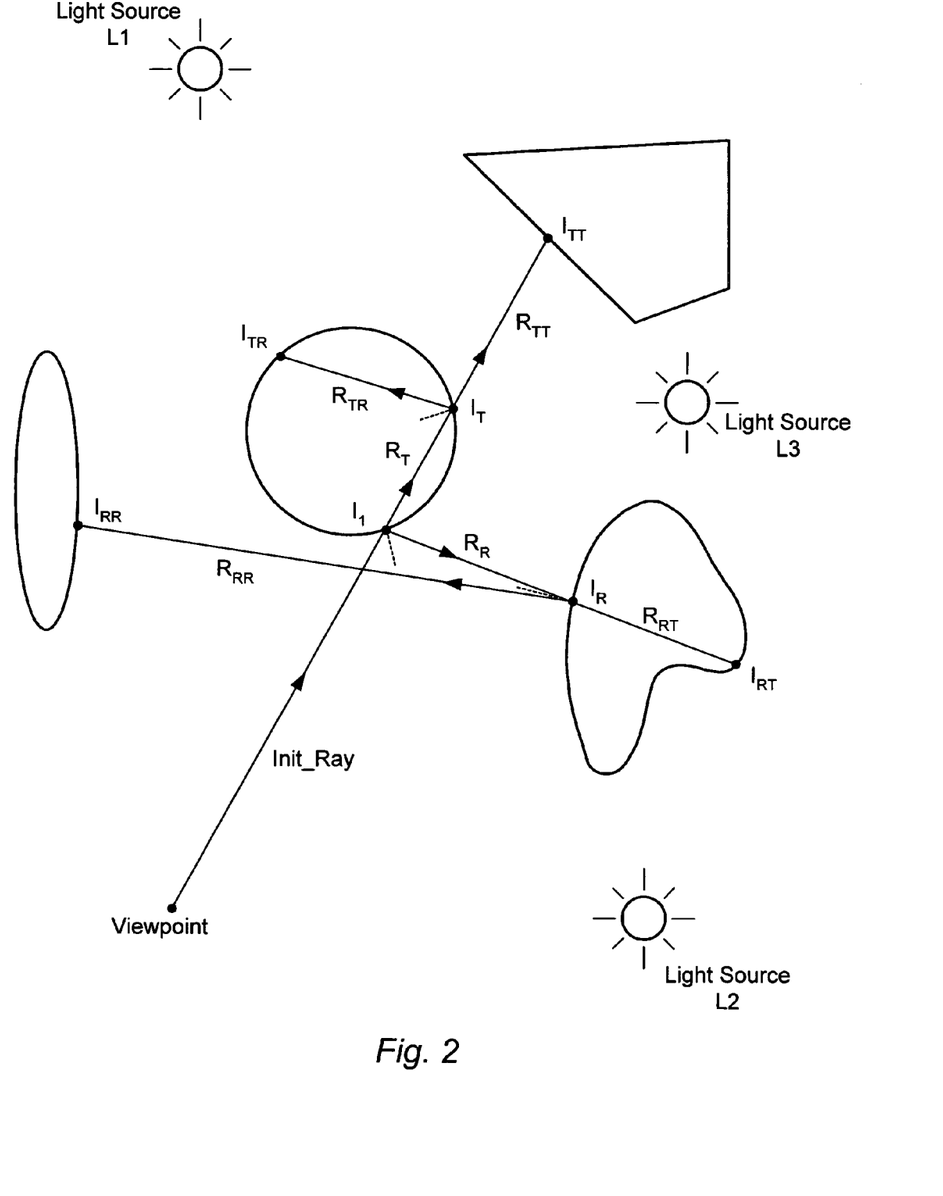
FIG. 2 is a diagram illustrating a system of rays derived from a single primary ray emanating from a viewpoint in a world space.

1. A host application transfers (or initiates the transfer of) a set of triangles (with descriptors) to the TRP. The triangles correspond to a set of objects. BeginScene and EndScene instructions may define the boundaries of each frame.
2. The vertices of the triangles in a scene are transformed from model space into world space. This transformation operation may be application programmable (e.g., using VGL instructions). The resulting objects (vertices) are inserted into subdivision structures.
3. After the triangles of the objects in a frame have been transformed, the tracing process may be started. The tracing process results in the identification of ray-object intersections and shadow checks at the intersections.
4. For each intersection prior to the $N^{th}$ intersections, N a positive integer, new reflective and transmissive rays are computed (as suggested by FIG. 2 for N=3). This step, referred to herein as ray spawning, may be application programmable. Repeat step 3 on the new reflective and transmissive rays.
5. The complete ray tree and corresponding set of lighting trees are sent to the SHP. If the SHP does not support local lighting, then the local lighting code may be performed by the TRP.
6. The SHP runs the shading code (e.g. VGL shading code) for each light tree. In one embodiment, the light-tree information per intersection may be automatically mapped to input registers of a vertex virtual machine (e.g. a DX8 VVM). The resulting color may be transferred to an output register, and thus, used to update a frame buffer.

In some embodiments, the TRP may implement the operations described by the following pseudeo-code:

```
while (!EndScene)
{
    Get object.
    for (all vertices of object)
    {
        Call VGL code to transform vertices from model to world space.
        VGL code may use input streams directly, or alternatively,
        the TRP may setup input registers before calling the VGL code.
        Update bounding values.
    }
    Add object to object list.
}
Perform tracing in batches of N_B rays.
Update interface structure and set status flag to the ready-to-shade state
(i.e. enabled state).
Call VGL code to compute reflective and transmissive rays.
Eventually call VGL code for local lighting.
```

The batch size $N_B$ is a positive integer. In one embodiment, $N_B$ equals 16.

In some embodiments, the SHP may implement the operations described by the following pseudo-code:

```
while (1)
{
    Check status flags;
    for (each enabled status flag)
    {
        Setup input registers accordingly;
        Call VGL code for SHP;
        Write result to frame buffer;
        Disable the status flag;
    }
}
```

3. Algorithm

The TRP may process multiple rays before passing the results to the SHP. This batch processing methodology makes the TRP processing and interfacing (with SHP) more efficient. Thus, assume that the TRP processes $N_B$ rays in a batch. For example, $N_B$ may equal 16 in one embodiment. Also, assume that each ray tree has a depth DR, where DR is a positive integer. For example, if DR equals three, reflective and transmissive rays are spawned up to the third intersection as suggested by FIG. 2. Thus, in this example, there are a total of 7 ray segments (1+2+4) per pixel.

In one set of embodiments, the TRP may perform the following ray-processing sequence:

1) Trace all of the $N_B$ primary rays until the first intersection. Determine shadowing for all $N_B$ intersections per light source.
2) Call VGL code to generate a reflective ray and a transmissive ray for all NB initial rays; this generates $2N_B$ second-stage rays.
3) Trace all of the $2N_B$ second-stage rays until the first intersection. Determine shadowing for all of the $2N_B$ intersections per light source.
4) Call VGL code to generate a reflective ray and a transmissive ray for all 2NB second-stage rays; this results in $4N_B$ third-stage rays.
5) Trace all of the $4N_B$ third-stage rays until the first intersection. Determine shadowing for all of the $4N_B$ intersections per light source.

Early termination of the rays (e.g. no reflective ray) is handled within the corresponding steps. The appropriate intermediate data is stored in the corresponding BatchRayTree and LightRayTree structures.

3.1 Tracing Processsor (TRP) Operation

In some embodiments, the TRP may perform the following operations.

A. Transformation

A set of objects forming a frame are transformed from model to world space. This transformation step may be application programmable (e.g., with VGL instructions).

B. Tracing of rays

The TRP traces batches of primary rays emanating from a viewpoint in the world space. The rays correspond to pixel locations on a display surface. For each batch, the TRP traces all $N_B$ primary rays of the batch. The tracing generates $N_B$ ray trees per batch, i.e. one ray tree for each of the $N_B$ initial rays in a batch. The ray spawning computation (i.e. the computation of reflective and transmissive rays at the intersection points) may be application programmable (e.g., with VGL instructions).

C. Determine Local Lighting

The TRP determines for all intersection points which light sources are visible from the intersection point. The TRP stores the corresponding light information into a local light structure. One local light structure may be used per light source. (Local light structures are also referred to herein as light trees.)

In one set of embodiments, Step B and Step C may be implemented on the same general-purpose CPU. In one alternative embodiment, Step B may be implemented on a general-purpose CPU, and Step C may be implemented on a separate CPU or SP.

D. Transfer to SHP

The TRP passes a ray tree and the corresponding set of local light structures to the SHP. The SHP performs shading using the ray tree and the local light structures. When the TRP has passed the ray trees and local light structures for the last pixel of the current frame, the TRP may start on the next frame by returning to step A. Shading may also be application programmable (e.g, with VGL instructions).

This mechanism benefits from the definition of an efficient interface between the TRP and SHP. The interface may provide support for multi-processor implementations (e.g. symmetric multi-processor implementations).

3.2 SHP Implementation

In various embodiments, the SHP may have varying computational capabilities. The TRP may be configured to interface with SHPs which span a spectrum of computational capabilities. The host application may provide the TRP with an indication of the computational capabilities of the specific SHP with which it will interact.

In one embodiment of the SHP, the SHP may be configured to perform local lighting. In this case, the TRP will not perform the local lighting computation; instead it will pass the necessary parameters to the SHP. The TRP determines for a given light source, whether the light source is visible (no shadow) or invisible (shadow) from a given intersection point. The resulting information is then stored in the corresponding light tree.

If the SHP cannot perform local lighting, the local lighting code (e.g. VGL code) may be executed by the TRP before passing the results to the SHP.

In one set of embodiments, the SHP capabilities (as represented by the SHP_CAPS indicator) may be classified as follows.

SHP_LOCL_D:

SHP performs computation of distance to light source

SHP performs attenuation (both for distance and local lighting)

SHP performs local lighting

SHP performs global lighting combine

SHP_LOCL:

SHP performs local lighting

SHP performs global lighting combine

SHP_NULL:

SHP performs only global lighting combine

For the sake of simplicity, in many of the examples to follow, it may be implicitly assumed that the SHP performs the local lighting computation. However, it should be borne in mind that the TRP may be configured to perform local lighting in embodiments where the SHP is not so configured.

4. Interface

It is very desirable to create a flexible interface between the TRP and the SHP, i.e. an interface that will allow the various embodiments of the SHP to perform tasks of varying complexity.

Therefore the data structures may be divided up into two main structures. An additional static parameter structure may contain static parameters for the light source and the attenuation factors for the distance traveled. The static parameter structure may change infrequently. For example, it may be static for at least one frame. This static parameter structure is further defined in section 4.4.

The two main data structures may contain information corresponding to a batch of NB primary rays (e.g. $N_B$=16).

The first structure BatchRayTree contains the $N_B$ RayTree structures corresponding to the $N_B$ primary rays. The RayTree structures contain intersection information.

The second structure BatchLightTree contains the LightTree structures for the $N_B$ rays. The LightTree structures contain the lighting related information. One LightTree structure is generated per primary ray and per light source. The BatchLightTree structure may be a simple array of LightTree structures. Each primary ray of a batch is associated with a segment of the array. For example, if two light sources are used, the lighting information for primary ray #1 can be found at index 2 and 3; for primary ray #3 at index 6 and 7. So the size of the array may be:

$N_B$*MaxNumLights.

This BatchLightTree organization has the advantage that all the lighting information spans one contiguous memory region. The same applies to the BatchRayTree structure. The TRP may then maintain only two pointers, one to the RayTree and another to the LightTree structure.

This is done to allow the SHP to effectively DMA or access the data with just two pointers.

In some embodiments, a buffer memory may intervene between the TRP and SHP. The TRP writes the BatchRayTree data structures and the BatchLightTree data structures to the buffer memory, and the SHP reads these data structures from the buffer memory. The buffer memory may be double buffered to allow overlapped TRP and SHP operations. Swapping of buffer segments in the memory buffer may occur on frame boundaries.

The RayTree and LightTree data structures may also be used as the internal data structures of the TRP. Thus, no unnecessary copying of data is required.

In one set of embodiments, the Batch structures may be defined as follows:

```
typedef struct tstBatchRayTree {
    stRayTree RayTree[RTRT_NUMBATCHRAYS];
} stBatchRayTree;
typedef struct tstBatchLightTree {
    stLightTree LightTree[RTRT_NUMBATCH-
        RAYS*RTRT_MAXNUMLIGHTS];
} stBatchLightTree;
```

Because the ray trees of a batch are stored in a BatchRayTree structure, and the local light structures of a batch are stored in a separate BatchLightTree structure, the number of rays in a batch may be changed dynamically. However, in one alternative embodiment, the ray trees and local light structures of a batch may be packed into a single structure.

The structure of the ray tree and the structure of the light tree may be very similar. They may have the same node topology, but their nodes may contain different information. The ray tree may contain intersection information, whereas the light tree may contain lighting information at a given node.

Figure 3:
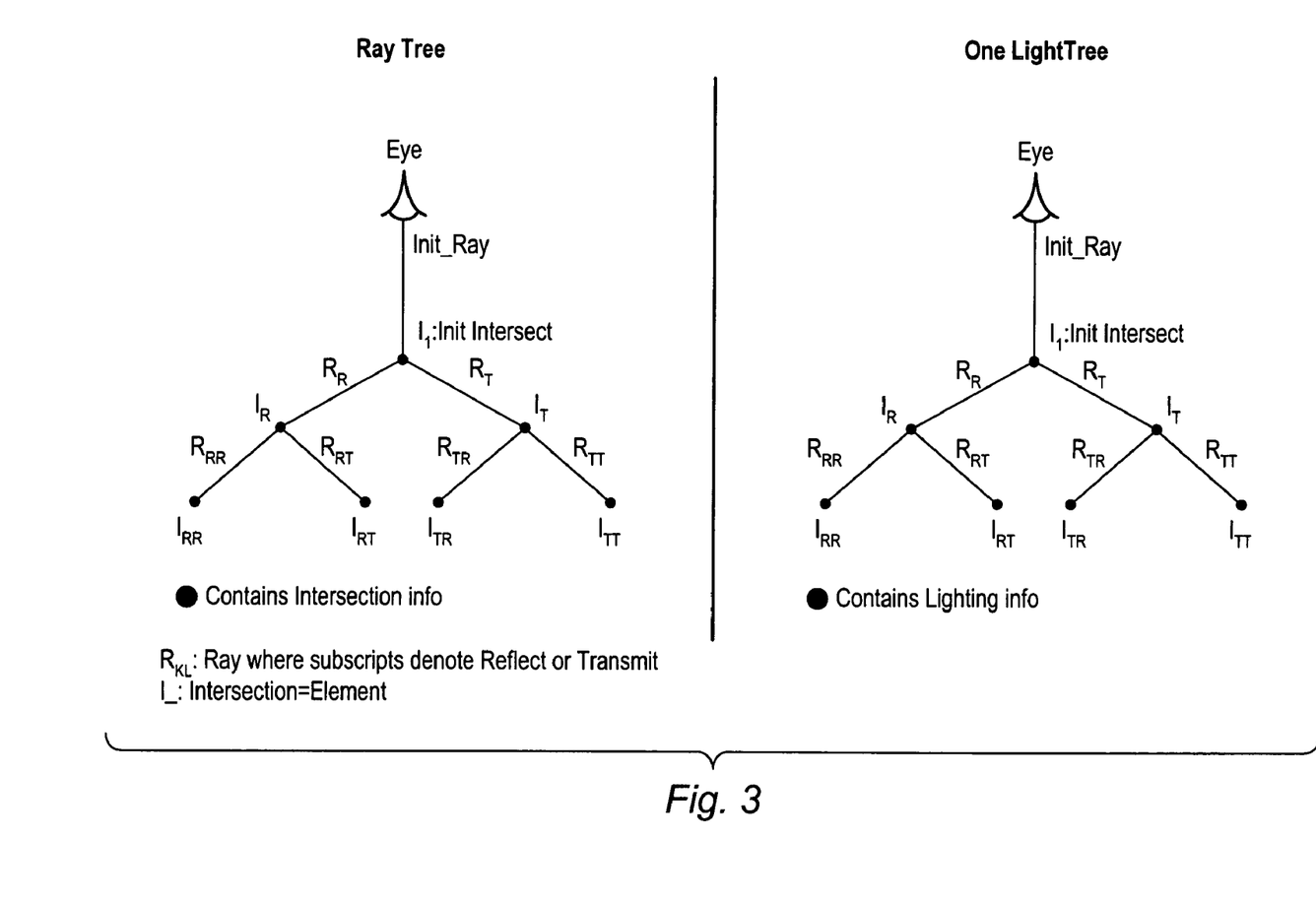
FIG. 3 illustrates one embodiment of a ray tree and a corresponding light tree which contain intersection information and lighting information respectively.

A ray tree having depth D has $1+2+4+\ldots+2^{(D-1)}=2^D-1$ nodes. For example, for depth D=3, the ray tree has seven nodes. Each node stores information concerning a corresponding intersection point. Each local light structure may have the same depth and number of entries as suggested by FIG. 3.

4.1 Symmetric Multi-Processing (SMP) Support

In one set of embodiments, the TRP and/or the SHP may support multiple processors (e.g. symmetric multi-processors). The TRPs may communicate to the SHP which rays in a batch are ready to be processed and which are not. Therefore, a status flag may be included in each ray tree. The status flag indicates whether a ray is ready to be shaded or not.

Each processor of the TRP operates on a different batch of primary rays. When a primary ray within a batch is ready to be shaded, meaning that the primary ray has been traced completely, the processor sets the status flag to the ready-to-shade state.

When SHP detects that the status flag of a given ray tree is set to ReadyToShade, it will load the shading parameters of the ray tree and its corresponding light trees, and then restore the status flag to the available state. The TRP waits until after a status flag has been set to the available state before putting new information into the ray tree and corresponding light trees.

The buffer (which stores the ray trees and light trees) may contain any number of ray trees as mentioned above. The individual ray trees in the BatchRayTree may be configured (e.g. padded) so that they fall into different cache lines to avoid coherency ping-pong between the different TRP processors. Similarly, packets of light trees belonging to different ray trees may be configured so that they fall into different cache lines.

This flag-based handshaking mechanism is very flexible with regard to the distribution of the rays from the TRP to the SHP. It also hides the nature of the TRP from the SHP. Regardless of whether there is one processor or multiple processors in the TRP, the buffer and the synchronization are identical. This mechanism also avoids the difficulty of having to synchronize the TRP processors before the buffer is updated.

In one set of embodiments, the SHP automatically scans each flag to determine whether to process the corresponding primary ray. Alternatively, to reduce memory traffic, the SHP may use the first flag in a BatchRayTree as a trigger event to process the first primary ray and then scan the other primary rays in the batch.

The stride between successive ray trees in the BatchRayTree may be indicated to the SHP. The stride is a global parameter, and may either be put into the static parameter structure or directly programmed into the SHP.

In addition to multiple TRPs processing multiple batches in parallel, multiple SHPs may also process multiple batches in parallel. The same flag-based handshaking mechanism as described above may be used.

This handshaking mechanism supports any number of TRPs and SHPs without modification. This mechanism allows the number $N_T$ of TRP processors and the number $N_S$ of SHP processors to be independent. In fact, $N_T$ and/or $N_S$ may be changed dynamically.

4.2 Ray Tree Structure

A ray tree structure contains the intersection information for the rays derived from a single primary ray. The following describes an exemplary structure for the ray tree. It is noted that the ray tree may have any of various structures for various special embodiments. Assuming a depth level of 3, the ray tree structure has 7 entries as follows.

```
typedef struct tstRayTree {
    stRayTreeElement InitRay;      //    Initial Ray
    stRayTreeElement Ray_R;        //    Refl. Ray
    stRayTreeElement Ray_T;        //    Transm. Ray
    stRayTreeElement Ray_R_R;      //    Refl._Refl. Ray
    stRayTreeElement Ray_R_T;      //    Refl. Transm. Ray
    stRayTreeElement Ray_T_R;      //    Transm._Refl. Ray
    stRayTreeElement Ray_T_T;      //    Transm._Transm. Ray
} stRayTree;
```

To support multiple processors with SMP for either the TRP and/or the SHP, the TRPs may indicate to the SHP which primary rays (i.e. which ray trees) are ready to be processed and which are not. Therefore, a status flag may be included in each ray tree. The status flag indicates whether the primary ray (i.e. the ray tree) is ready to be shaded or not. Each processor of the TRP may process different batches of rays.

The stRayTreeElement structure may contain the following information:
  Status flag
  Incident Ray direction
  Distance traveled (if SHP_CAPS=SHP_LOCL_D) or attenuation factor directly (if SHP_CAPS=SHP_LOCL or SHP_NULL)
  Intersection coordinates
  Normal at intersection point
  u-v (z-w) coordinates for texturing
  Pointer to an object descriptor which contains information about the intersected object.

The distance traveled may be used to attenuate the ray contribution. The attenuation function may have any desired form. For example, in one embodiment, the attenuation function may be a quadratic polynomial with three coefficients such as $Att(x)=a+bx+cx^2$, where x is the distance traveled from the light source to the intersection point.

4.3 Light Tree Structure

A light tree structure may contain the lighting information for each of the intersection points of a given ray tree for one light source. Each node of the light tree may relate to a corresponding node of the ray tree. There may be one light tree structure for each light source.

In one embodiment, the light tree structure has the following form. Assuming a depth level of 3, the light tree structure has 7 entries as follows.

```
typedef struct tstLightTree {
    stLightTreeElement InitRay;      // Initial Ray
    stLightTreeElement Ray_R;        // Refl. Ray
    stLightTreeElement Ray_T;        // Transm. Ray
    stLightTreeElement Ray_R_R;      // Refl. Refl. Ray
    stLightTreeElement Ray_R_T;      // Refl. Transm. Ray
    stLightTreeElement Ray T_R;      // Transm. Refl. Ray
    stLightTreeElement Ray T_T;      // Transm. Transm. Ray
} stLightTree;
```

The SHP uses the light tree as an input. The VGL shader code and the SHP capabilities indicator determine what kind of processing can be performed by the SHP.

The state of the SHP capabilities (SHP_CAPS) indicator may determine what information is stored in the stLightTreeElement structure. If the SHP can perform local lighting (e.g. SHP_CAPS=SHP LOCL_X), then the TRP will put the appropriate information including shadow flag into the light tree. The SHP will then perform local lighting and the global lighting combine step as described below.

If the SHP cannot perform local lighting (e.g. SHP_CAPS=SHP_NULL), the TRP will perform the local lighting, and store the final diffuse and specular values for each intersection point into the light tree structure. The SHP will then perform the global lighting combine step.

Thus, the stLightTreeElement structure may be assembled according to the state of the SHP_CAPS indicator.

In some embodiments, the stLightTreeElement structure may contain the following information.

Local Lighting information

A. Diffuse color (0 if in intersection is in shadow).

Depending on the SHP capabilities, this element may have different meanings.

If SHP has local lighting capabilities (SHP_CAPS= SHP_LOCL X), this intensity is the diffuse light intensity at the light source masked by shadowing. For a diffuse light, the SHP calculates an attenuation of the diffuse light intensity for the distance traveled between the light source and the intersection point, a dot product between normal vector (of object at intersection point) and light direction, and a product of object color and diffuse coefficient.

If the SHP has no local lighting caps (SHP_CAPS= SHP_NULL), this intensity is the final diffuse component.

B. Specular color (0 if intersection is in shadow).

Depending on the SHP capabilities, this element may have different meanings.

If SHP has local lighting caps (SHP_CAPS=SHP_LOCL_X), this intensity is the specular light intensity at the light source masked by shadowing. For a specular light the SHP calculates attenuation, generates a halfvector, calculates a dot product between normal vector and halfvector, computes specular falloff, and multiplies object color and specular coefficient.

Eye vector is the inverse incident ray direction from the RayTree of the same element.

If the SHP has no local lighting caps (e.g. SHP_CAPS= SHP_NULL), this intensity is the final specular component.

C. Color3: Color3 is an additional color which may be generated by the TRP. It may represent, e.g., the color of a photon map lookup. This color may be useful if the SHP is programmable. For example, an algorithm programmed with VGL code may use this color.

D. Shadow flag: equals one if intersection point is in shadow; otherwise the light source is visible from the intersection point.

E. Transparency coefficient: multiplies the text alpha during tracing step.

F. Reflectance coefficient: may be modified with a TBD value during tracing. (TBD is an acronym for "to be determined").

The following entries may be used if the SHP performs local lighting (e.g. SHP_CAPS=SHP_LOCL_X):

G. An entry may be used to determine the attenuation factor for point and spot lights. Depending on the values of the SHP_CAPS indicator, this entry may have different meanings as follows.

If SHP_CAPS=SHP_LOCL_D, this entry is not needed as the SHP itself computes distance to the light source. Light source position is stored in the static parameter structure. Intersection position is stored in the corresponding RayTree entry.

If SHP_CAPS=SHP_LOCL or SHP_NULL, this entry is the attenuation factor which is computed by the TRP.

H. Light Direction 4.4 Static Parameter Structure

The static parameter structure may contain parameters which are static for at least one frame. It may contain the following entries.

1. Attenuation factors to compute attenuation for distance traveled from light source to an intersection point specified by the ray tree.
2. Strides for ray trees and packets of light trees. These strides may be used for multiple processor support and is optional. Depending on the implementation, the strides may also be directly written to registers in the TRPs and SHPs.

Per light source:

3. Type of light source (e.g. diffuse, point, spot, etc.). In the case of a programmable SHP, this information may not be required because it is specified in the local lighting code (e.g. VGL lighting code).
4. Position of light source
5. Attenuation factors (for point lights and spot lights)
6. Cone cosines (for spotlights)

The light source parameters may be stored in an array. The index used to access successive records in this array may be identical to the index used to access successive light trees in the BatchLightTree. This one-to-one correspondence makes addressing easy.

If it is anticipated that the light source parameters will change frequently, the light source parameters may be appended to the light trees. The light source parameters for a given light source may be appended to the corresponding light tree. Similarly, the attenuation factors may also be appended to the ray trees.

5. Global Lighting Combine

The global lighting combine (GLC) step may be performed after the local lighting step and before rasterizing the pixel. The GLC step may be application programmable (e.g. with VGL instructions).

The GLC step combines the local lighting values in a light tree. Initially, the diffuse and specular components may be added to obtain a local color value at each node of the light tree. (Recall that the nodes of the light tree correspond to the intersection nodes of the ray tree). In one set of embodiments, the light tree may then be processed (in conjunction with the ray tree) from bottom to top as follows:

A) The texture values at the leaf intersection points (i.e. intersection points I_R_R, I_R_T, I_T_R and I_T_T) are determined (e.g. by a table lookup) using the uv texture coordinates and object pointers pOBJ associated with the leaf intersection points.

B) The local color values at the leaf nodes of the light tree are combined with the corresponding texture values resulting in textured local color values Loc(I_R_R), Loc(I_R_T), Loc(I_T_R) and Loc(I_T_T).

C1) Each of the four textured local color values is multiplied with the corresponding reflective or transmissive coefficient of intersection I_R or intersection I_T:

Loc(I_R_R)*refl(I_R)
Loc(I_R_T)*trans(I_R)
Loc(I_T_R)*refl(I_T)
Loc(I_T_T)*trans(I_T).

C2) The reflective and transmissive products at each of intersections I_R_ and I_T are added as follows to determine global color values at these intersections:

I_R_glob=Loc(I_R_R)*refl(I_R)+Loc(I_R_T)*trans(I_R)

I_T_glob=Loc(I_T_R)*refl(I_T)+Loc(I_T_T)*trans(I_T)

D) The same texture lookup and color combine operation may be performed for the intersections I_R and I_T resulting in textured local color values Loc(I_R) and Loc(I_T) respectively.

E) The textured local color values at intersections I_R and I_T may be added to the corresponding global color values resulting in total color values at these intersections:

Tot_R=Loc(I_R)+I_R_glob
Tot_T=Loc(I_T)+I_T_glob.

F) The total color values Tot_R and Tot_T are respectively multiplied by the reflective and transmissive coefficients of the intersection node I_1, and the two resulting products are added, yielding a global color value I_1_glob at intersection I_1:

I_1_glob=Tot_R*refl(I_1)+Tot_T*trans(I_T)

G) The same texture lookup and color combine with local lighting may be performed for intersection I_1 resulting in a textured local color value Loc(I_1) for intersection I_1.

H) The textured local color Loc(I_1) may be added to the global color 11_1_glob to obtain a total color value for intersection I_1:

Tot_1=Loc(I_1)+I_1_glob.

The example above has been described in terms of a ray tree and light tree with depth D=3. However, the example naturally generalizes to trees of arbitrary depth.

The example above illustrates one possible method for performing the GLC step, and is not intended to be limiting. A wide variety of methods are contemplated. In fact, the specific method to be used may be determined by the application designer (e.g. through VGL code programming).

Texturing may apply any desired transformation to the local lighting. Texture alpha values may be used during tracing to determine transparency. A final transparency coefficient is determined in the tracing stage and placed into the tracing coefficient field of the light tree. The pOBJ descriptor contains information on how to compute the final transparency value from the object transparency and the texture alpha value (TBD).

An example of the GLC computation is shown below. For the sake of simplicity, part of the computation is suppressed. However, the suppressed portion (i.e. the computation of Tot_T) may easily be derived based on parallelism of structure with respect to the disclosed portion (i.e. the computation of Tot_R).

$$Tot\_1 = Loc(I\_1) +$$
$$att(d(I\_R)) * refl(I\_1) * Tot\_R +$$
$$att(d(I\_T)) * trans(I\_1) * Tot\_T;$$
$$Loc(I\_1) = TexCombine(Light(I\_1), Textures(I\_1));$$
$$Tot\_R = Loc(I\_R) +$$
$$att(d(I\_R\_R)) * refl(I\_R) * Loc(I\_R\_R) +$$
$$att(d(I\_R\_T)) * trans(I\_R) * Loc(I\_R\_T);$$
$$Loc(I\_R) = TexCombine(Light(I\_R), Textures(I\_R));$$
$$Loc(I\_R\_R) = TexCombine(Light(I\_R\_R), Textures(I\_R\_R));$$
$$Loc(I\_R\_T) = TexCombine(Light(I\_R\_T), Textures(I\_R\_T));$$

where,

Light(X): local color value without texturing at intersection X;

Textures(X): represents a texture lookup (possibly multiple textures) at intersection X;

TexCombine: function to combine texture with local color value;

Loc(X): textured local color value at intersection X;

Tot_A: total color value at intersection I_A;

refl(X): reflective coefficient at intersection X;

trans(X): transmissive coefficient at intersection X;

att(d(X)): attenuation function of distance traveled from X (in ray tree).

6. Parallel Data Transfer

In one set of embodiments, the transfer of ray trees and light trees between the TRP and SHP may be distributed across multiple links as described in the following. In one embodiment, one or more of these links could be realized by the Lighting Data Transfer Busses (LDTs) manufactured by Advanced Micro Devices (AMD).

In some embodiments, multiple parallel TRPs and SHPs are utilized. Logically, there are three distinct cases regarding the number $N_{TRP}$ of TRPs and the number $N_{SHP}$ of SHPs:

A. $N_{TRP}=N_{SHP}$
B. $N_{TRP}>N_{SHP}$
C. $N_{TRP}<N_{SHP}$

These three cases are described in more detail in the following sections.

6.1 Identical count of TRPs and SHPs

Suppose that the number of TRPs and the number of SHPs are identical. In one set of embodiments, each TRP may couple to a corresponding SHP through a dedicated link as suggested by FIG. 4. Thus, the total transfer bandwidth is the sum of the bandwidths of all links.

Figure 4:
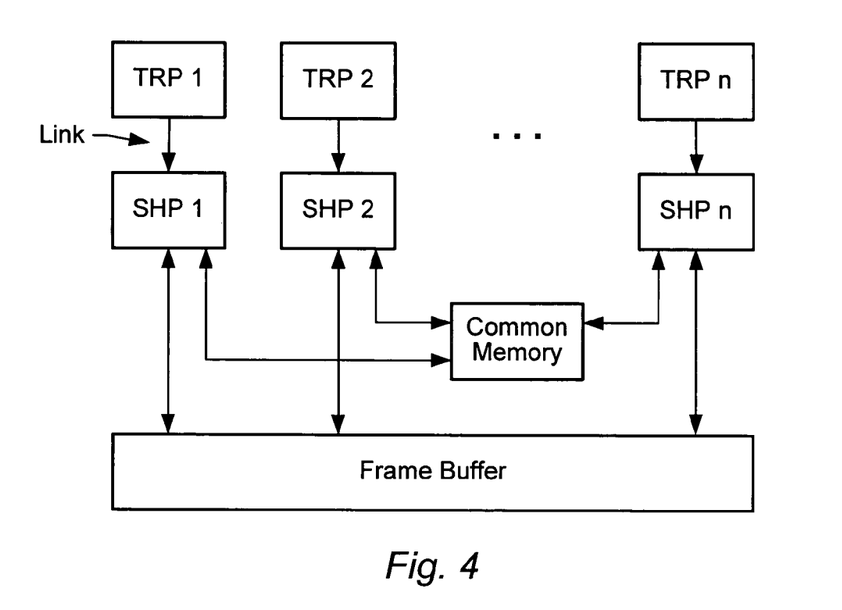
FIG. 4 illustrates one embodiment of a visualization system in which the number of tracing processors (TRPs) is equal to the number of shading processors (SHPs).

In some embodiments, the links are configured so that almost all of the data is transferred through the links in one direction: i.e. downstream from the TRPs to the SHPs. In one particular embodiment, the links are configured so that no turnaround is required. Because, the TRP doesn't have to wait for any results from the SHP, high link utilization may be achieved. Also unidirectional dataflow allows more freedom for the computational stages in the TRP to be pipelined heavily without negatively impacting performance.

The SHP may control the state of a ready-to-receive flag. The ready-to-receive flag indicates to the TRP whether the SHP is ready to receive information from the TRP. This ready-to-receive flag may be implemented in the hardware (HW) control flow mechanism of the underlying link. In this case the TRP may check the link to determine whether it may send data or not. On the SHP receiving side, a first-in first-out (FIFO) may buffer the input data.

The SHP may have a FIFO sufficiently deep to store at least a tree bucket (i.e. a ray tree and light trees corresponding to a single pixel). In one set of embodiments, the synchronization mechanism may operate as follows.

1. TRP: The TRP checks the ready-to-receive flag. If the ready-to-receive flag is enabled (e.g., has the value one), the TRP may send another tree bucket (corresponding to one pixel) to the SHP. If the ready-to-receive flag is disabled (e.g., has the value zero), the TRP may wait until the ready-to-receive flag is enabled.
2. SHP: While receiving a tree bucket, the SHP may determine whether it can accept another bucket or not. If the SHP can accept another bucket, the SHP enables (or maintains the enabled state of) the ready-to-receive flag. If the SHP cannot accept another bucket, the SHP disables the ready-to-receive flag.

This synchronization mechanism requires little overhead and is fast.

The SHPs may also access some common memory which stores global data such as the object descriptors, texture maps, etc. The SHPs may have special cache memories to decouple accesses to the common memory.

6.2 TRP Count Greater than SHP Count

In the case where the number of TRPs is greater than the number of SHPs, each SHP may receive data from multiple TRPs. The communication between each SHP and the multiple TRPs which feed it may be achieved using a bridge component as suggested by FIG. 5. The bridge combines the multiple TRP links into one link to the corresponding SHP. In the embodiment illustrated in the figure there are four TRPs and two SHPs. However, a wide variety of set of values are contemplated for the number of TRPs and the number of SHPs. As with the embodiments of section 6.1, the SHPs may access a common memory.

Figure 5:
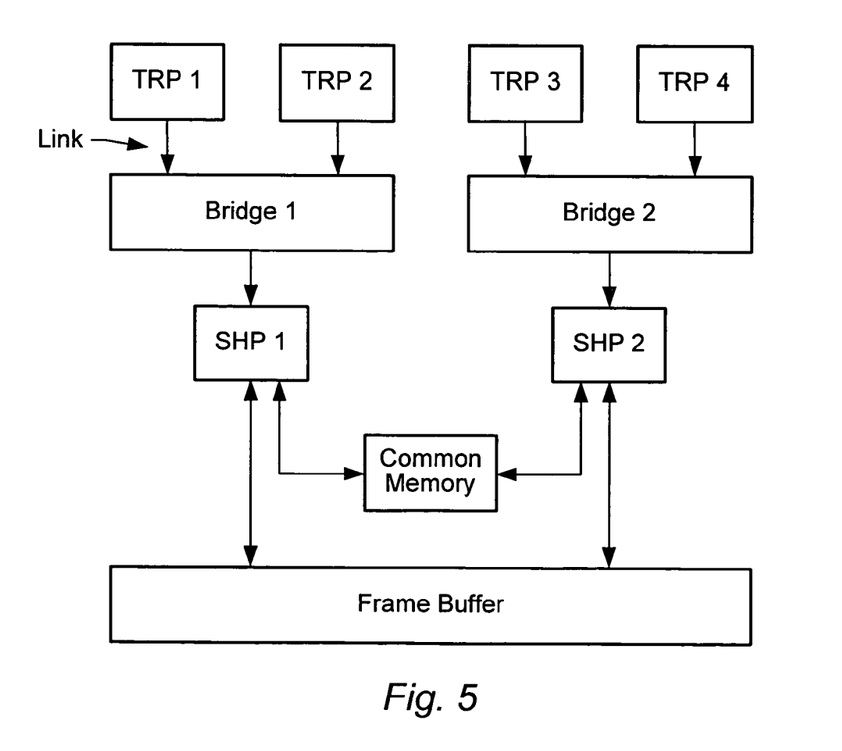
FIG. 5 illustrates one embodiment of a visualization system in which the number of tracing processors (TRPs) is greater than the number of shading processors (SHPs).

The synchronization protocol may be very similar to that described above except that additional information may be used to indicate the TRP which sent a given bucket. This additional information may not be required for the shading process itself but may be used for the transmission of the ready-to-receive flag. Thus, the SHP may selectively control the data transfers for each TRP.

There are at least two possibilities for including the additional information. One possibility is to use the source address of the link as in Advanced Micro Devices' LDT. The second possibility is to include a tag as an additional field in the ray tree structure. The tag identifies the TRP which sent the data. Thus, the SHP may use that information to send the ready-to-receive flag to the corresponding TRP.

6.3 TRP Count Less than SHP Count

In the case where the number of TRPs is less than the number of SHPs, each TRP may send data to multiple SHPs. Each TRP may send data to the corresponding multiple SHPs using a bridge component. The bridge component may connect the single TRP link to multiple SHP links as suggested in FIG. 6. In the illustrated example, there are two TRPs and four SHPs. However, a wide variety of set of values are contemplated for the number of TRPs and the number of SHPs. Again, the SHPs may access a common memory as in section 6.1.

Figure 6:
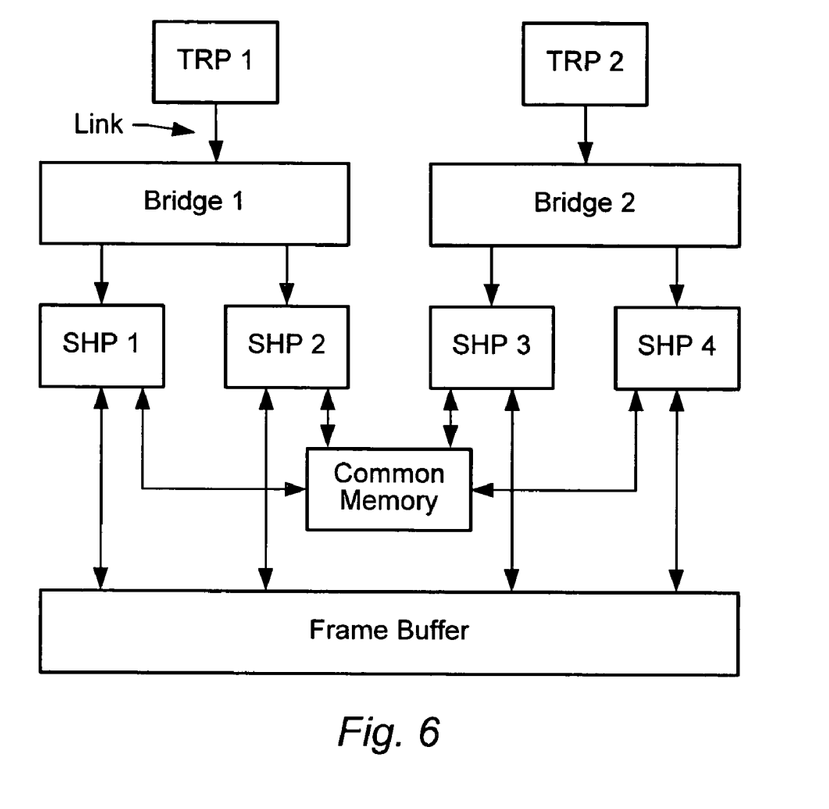
FIG. 6 illustrates one embodiment of a visualization system in which the number of tracing processors (TRPs) is less than the number of shading processors (SHPs).

The synchronization protocol may be very to the protocol in section 6.2. However here the additional tag may be used to send the ready-to-receive flag back to the TRP and not to the other SHPs (link addressing).

The TRP may send buckets to the SHPs in a certain order to split up the work load for the SHPs. Multiple distribution methods may be used such as round robin or any of various load-balancing schemes.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system for generating images of three-dimensional objects, the system comprising:
   one or more tracing processors;
   one or more shading processors;
   wherein each of said tracing processors is configured to (a) perform a first set of computations on a primary ray emanating from a viewpoint resulting in a ray tree and a set of one or more light trees, (b) transfer the ray tree and set of one or more light trees to one of said shading processors, and (c) repeat (a) and (b) for each ray of a plurality of primary rays emanating from the viewpoint;
   wherein each of said shading processors is configured to (d) receive a ray tree and set of one or more light trees from one of said tracing processors, (e) perform a second set of computations on said received ray tree and corresponding set of one or more light trees to determine a color value that determines at least a portion of a pixel in an output image, and (f) repeat (d) and (e) a plurality of times;
   wherein each of said tracing processors is configured to receive ray spawning code in response to one or more commands asserted by a software application executing on a host computer;
   wherein said first set of computations includes one or more ray spawning operations, wherein each of the tracing processors performs the ray spawning operations by executing the ray spawning code.

2. The system of claim 1, wherein the color values generated by repeating (d) and (e) a plurality of times determine at least a portion of a frame to be displayed on a display device.

3. The system of claim 1, wherein each of said tracing processors is configured to transfer the ray tree and set of one or more light trees to said one of said shading processors in response to a ready-to-receive flag being asserted by said one shading processor.

4. The system of claim 1, wherein each shading processor is configured to assert a ready-to-receive flag in response to a determination that the shading processor has sufficient storage capacity to receive another ray tree and set of one or more light trees from said one of the tracing processors.

5. The system of claim 1, wherein one or more of the tracing processors include a general-purpose central processing unit (CPU).

6. The system of claim 1, wherein the shading processors are special-purpose processors configured to provide support for a virtual graphics language.

7. The system of claim 1, wherein the first set of computations operate on a set of vertices and corresponding normals defining a collection of objects for a scene, wherein nodes of the ray tree correspond to intersections between the objects and rays derived from said primary ray.

8. The system of claim 7, wherein each of the one or more light trees includes lighting information with respect to a corresponding light source for each of the intersections in an associated ray tree.

9. The system of claim 7 further comprising one or more transform processors configured to transform the set of vertices and corresponding normals from an object space to a world space, wherein the first set of computations operate on the set of vertices and normals after said transformation.

10. The system of claim 7, wherein the one or more tracing processors are further configured to transform the set of vertices and corresponding normals from an object space to a world space prior to performing the first set of computations.

11. The system of claim 1, wherein the first set of computations include repeated applications of:
a ray tracing computation which propagates a ray to determine an intersection with a nearest object along the ray's path;
a shadow information computation to determine visibility of one or more light sources at the intersection point; and
a ray spawning computation to compute a reflective ray and transmissive ray at the intersection.

12. The system of claim 11, wherein the ray spawning computation is application programmable by a software application executing on a host computer.

13. The system of claim 11, wherein the shadow information computation is application programmable by a software application executing on a host computer.

14. The system of claim 1, wherein the second set of computations includes a global lighting combine operation which combines information from the ray tree and the one or more light trees in a bottom-up fashion to determine the color value.

15. The system of claim 14, wherein said global lighting combine operation is application programmable by a software application executing on a host computer.

16. The system of claim 1, wherein each ray tree is associated with a corresponding primary ray emanating from the viewpoint, wherein the ray tree stores intersection information for a system of rays derived by propagation of the primary ray through one or more ray spawning operations.

17. A method for generating images of three-dimensional objects, the method comprising:
transferring ray spawning code to a first processing unit in response to a command from a software application executing on a host computer;
performing a first set of computations on the first processing unit to determine a ray tree and one or more light trees, wherein the first set of computations includes one or more ray spawning operations, wherein the first processing unit performs the ray spawning operations by executing the ray spawning code;
transferring the ray tree and the one or more light trees from the first processing unit to a second processing unit;
the second processing unit performing a second set of computations on the ray tree and one or more light trees to determine a color value, wherein the color value determines at least a portion of a pixel in an output image.

18. The method of claim 17 further comprising:
transferring global light combine code to the second processing unit, wherein said second processing unit performing the second set of computations includes performing a global light combine operation by executing the global light combine code.

19. The method of claim 17, wherein the second processing unit is a specialized processor configured to support a standardized application programming interface (API).

20. A system comprising:
one or more tracing processors configured to generate ray trees and light trees corresponding to primary rays emanating from a viewpoint in an object space;
one or more shading processors coupled to the tracing processors and configured to receive the ray trees and light trees and to operate on the ray trees and light trees to generate pixel values, wherein the pixel values determine an output image;
wherein each of said tracing processors is configured to receive ray spawning code in response to one or more commands asserted by a software application executing on a host computer;
wherein said generation of ray trees and light trees includes performing ray spawning operations, wherein each of the tracing processors performs the ray spawning operations by executing the ray spawning code.

21. The system of claim 20 further comprising one or more transform processors configured to transform a set of vertices and corresponding normals from object space to world space, wherein the vertices define a collection of objects.

22. The system of claim 20, wherein one or more of the tracing processors include a general-purpose CPU.

23. The system of claim 22, wherein the shading processors are specialized processors configured to support a virtual graphics language.

* * * * *